United States Patent [19]

Layton

[11] 4,305,274

[45] Dec. 15, 1981

[54] WAVEFORM GENERATOR

[75] Inventor: James E. Layton, Ochelata, Okla.

[73] Assignee: Phillips Petroleum Company, Bartlesville, Okla.

[21] Appl. No.: 105,041

[22] Filed: Dec. 18, 1979

Related U.S. Application Data

[63] Continuation of Ser. No. 955,843, Oct. 30, 1978, abandoned.

[51] Int. Cl.³ ............................................. G01V 13/00
[52] U.S. Cl. ................................................. 73/1 DV
[58] Field of Search .................... 73/1 DV; 367/13, 77

[56] References Cited

U.S. PATENT DOCUMENTS

| | | | |
|---|---|---|---|
| 3,386,039 | 5/1968 | Naive | 328/181 |
| 3,617,769 | 11/1971 | Hanson | 307/229 |
| 3,858,169 | 12/1974 | Bardeen | 73/1 DV |
| 4,043,175 | 8/1977 | Fredriksson et al. | 73/1 DV |
| 4,086,504 | 4/1978 | Ezell et al. | 367/77 |

OTHER PUBLICATIONS

G. E. Tobey, "Operational Amplifiers Design and Applications", McGraw-Hill, pp. 370-396, 1971.
J. G. Graeme, "Applications of Operational Amplifiers", McGraw-Hill, pp. 168-169, 1973.
"Voltage Regulator Handbook", National Semiconductor, pp. 10-29, 1977.

Primary Examiner—Stephen A. Kreitman

[57] ABSTRACT

A waveform generator is provided which is capable of generating simultaneously a plurality of electrical signals which have different waveforms. The waveform generator is completely battery operated and is particularly useful in testing multichannel devices where power is not available for standard waveform generators. A voltage regulation circuit is provided which provides a regulated voltage from a battery pack for use by the waveform generator. The forward voltage-current characteristics of the base emitter junction of a silicon transistor are used as the basis for the generation of a reference voltage for the voltage regulation circuit to thereby substantially minimize the battery drain caused by the use of a voltage regulation circuit.

35 Claims, 10 Drawing Figures

WAVEFORM GENERATOR

This application is a continuation of application Ser. No. 955,843, filed Oct. 30, 1978, now abandoned.

This invention relates to testing devices. In a particular aspect, this invention relates to method and apparatus for generating simultaneously a plurality of electrical signals, having different waveforms, for use in testing multichannel devices. In a more particular aspect, this invention relates to method and apparatus for generating simultaneously a plurality of electrical signals, having different waveforms, for use in testing multichannel devices where only battery power is utilized to generate the plurality of electrical signals. In another particular aspect, this invention relates to method and apparatus for providing a regulated voltage from a battery pack while substantially minimizing the power drain on the battery pack due to the use of voltage regulation circuitry. In another particular aspect this invention relates to method and apparatus for generating simultaneously a plurality of electrical signals having different waveforms and having variable frequencies so as to provide a frequency sweep of a desired frequency range.

Waveform generators are widely used for testing electrical circuits. Waveform generators are particularly useful for testing data processing channels or channels which link two devices to determine if the data processing channel is operational or to determine if the link between two devices is continuous. Many types of waveform generators are presently marketed by a number of manufacturers. However, in general, these waveform generators require an AC power source for operation.

In many cases, the data processing channel or the link which is to be tested is not readily accessible and is especially not readily accessible from the standpoint of providing AC power to a waveform generator to be utilized in testing the data processing channel or the link. This is especially true where remote devices are being utilized to acquire data with the data being transmitted then to a central location.

It is also very common to have a plurality of data processing channels in parallel in the same data aquisition device or to have a number of parallel links between two devices. It is thus desirable to be able to simultaneously generate a plurality of electrical signals, each having a different waveform, for use in testing the plurality of parallel data processing channels or the plurality of parallel links between two devices. In this manner, an indication is readily available as to exactly which one if any of the parallel data processing channels is inoperative or an indication may be provided as to which one, if any, of a plurality of parallel data links is inoperative.

Again, waveform generators are commercially available which can provide a plurality of electrical signals having different waveforms. However, in the past, waveform generators which have the capability of outputting a plurality of different waveforms have required substantial power, thus necessitating the availability of AC power to the waveform generator.

It is thus an object of this invention to provide method and apparatus for generating a plurality of electrical signals, having different waveforms, for use in testing multichannel devices where only battery power is utilized to generate the plurality of electrical signals.

It is a further object of this invention to provide electrical circuitry which is capable of generating simultaneously a plurality of electrical signals, having different waveforms, using only battery power.

Because the voltage levels and frequencies of the output signals from waveform generators must be stable, voltage regulators are commonly used to insure that the voltage level of the output signals from the waveform generator is substantially stable. However, voltage regulator circuits may use a substantial amount of power. This is generally irrelevant where AC power is available but must be considered where the waveform generator is being operated only from battery power. Accordingly, it is another object of this invention to provide method and apparatus for providing a regulated voltage from a battery pack while substantially minimizing the power drain on the battery pack due to the use of voltage regulation circuitry.

It is often desirable to use a waveform generator to test a data channel which contains a notch filter or other similar device. A frequency sweep must be provided which includes the notch frequency of the notch filter to insure that the notch filter or other similar device is operational. Accordingly, it is another object of this invention to provide method and apparatus for generating simultaneously a plurality of electrical signals having different waveforms and having variable frequencies so as to provide a frequency sweep of a desired frequency range.

In accordance with the present invention, method and apparatus is provided whereby electrical circuits are utilized to generate a ramp waveform. The ramp waveform is provided as one possible input to a voltage controlled oscillator. A reference voltage source is utilized to provide a regulated output voltage from a battery pack. The regulated output voltage is provided as a second possible input to the voltage controlled oscillator.

If the ramp voltage is selected to be supplied to the voltage controlled oscillator, then the plurality of output signals from the waveform generator of the present invention will sweep in frequency. If the regulated output voltage from the reference voltage source is selected to be input to the voltage controlled oscillator, then the plurality of output voltages from the waveform generator of the present invention will have a constant frequency.

The voltage controlled oscillator provides a triangular waveform and a square waveform as outputs in response to the reference voltage input or the ramp voltage input. Both the triangular waveform and the square waveform are provided to an output network and are thus provided as two of the plurality of output signals from the waveform generator of the present invention.

Electrical circuitry is provided which shapes the triangular waveform to provide a sine waveform. The sine waveform is also provided to the output network and provides a third one of the plurality of output signals from the waveform generator of the present invention.

Electrical circuitry is also provided which shapes both the triangular waveform and the square waveform to provide a sawtooth waveform. The sawtooth waveform is provided to the output network and is utilized as the fourth of the plurality of output waveforms from the waveform generator of the present invention.

Provisions are also made in the output network of the waveform generator of the present invention to allow the sine wave to be supplied as the plurality of output signals from the waveform generator. Thus the four output signals from the waveform generator of the present invention may either be all sine waves or they may be four different waveforms.

The forward voltage-current characteristics of the base emitter junction of a silicon transistor are used as the basis for the generation of a reference voltage from the reference voltage source instead of zener voltage of a zener diode which is commonly used as a reference voltage. This results in a minimum battery drain while still providing a regulated voltage output.

Other objects and advantages of the invention will be apparent from the description of the invention and the appended claims as well as from the detailed description of the drawings in which:

Figure 1:
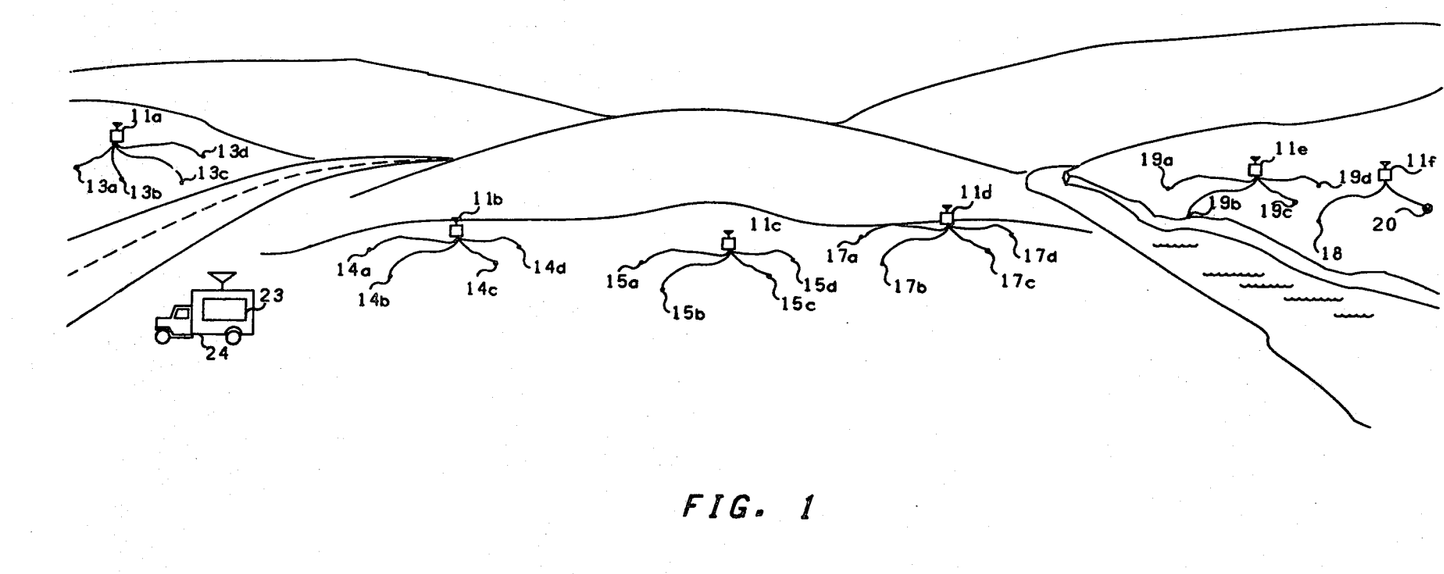
FIG. 1 is an illustration of a possible physical arrangement of the components of a seismic exploration system.
Figure 2A:
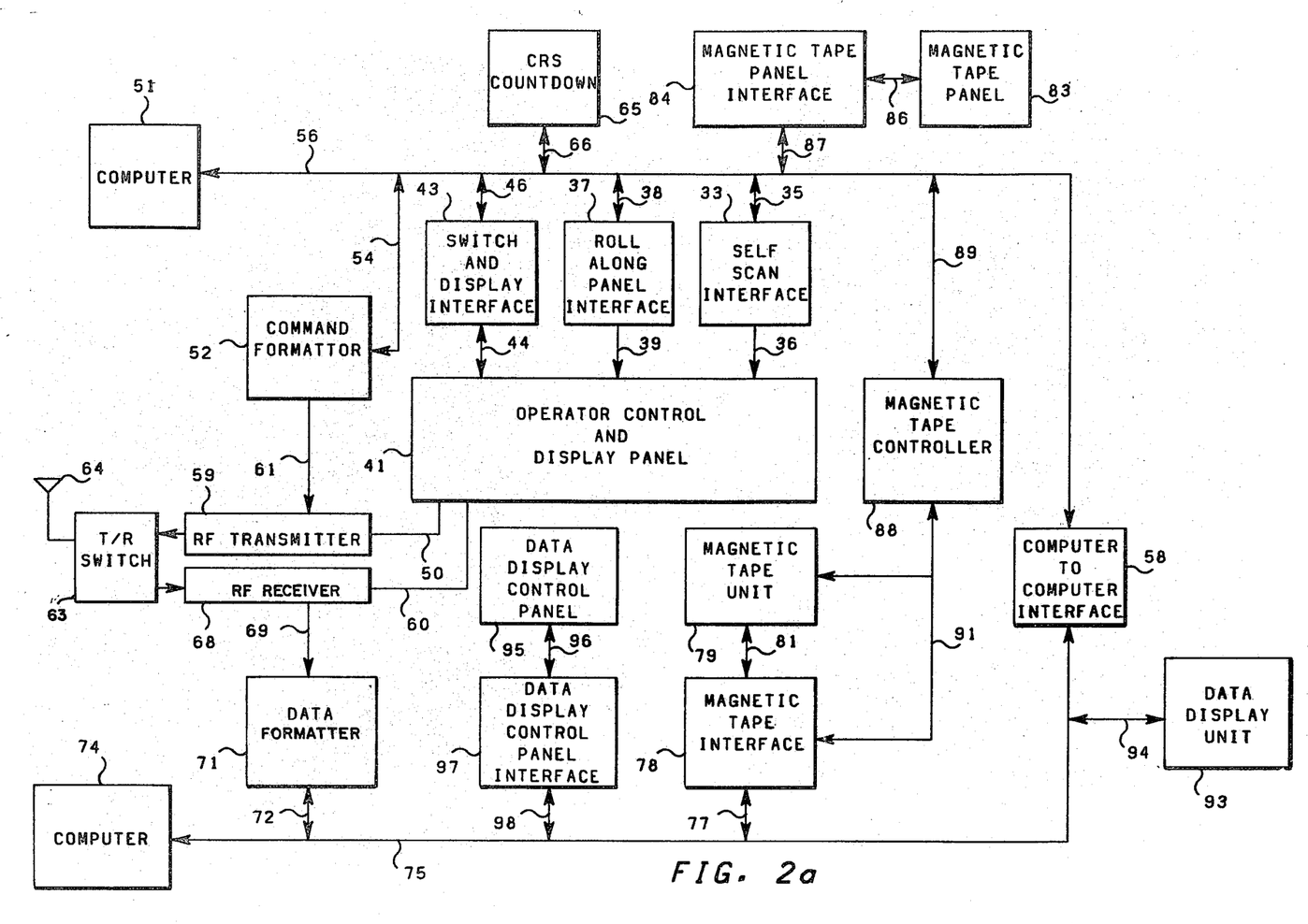
FIG. 2a is a block diagram of a central recording station.
Figure 2B:
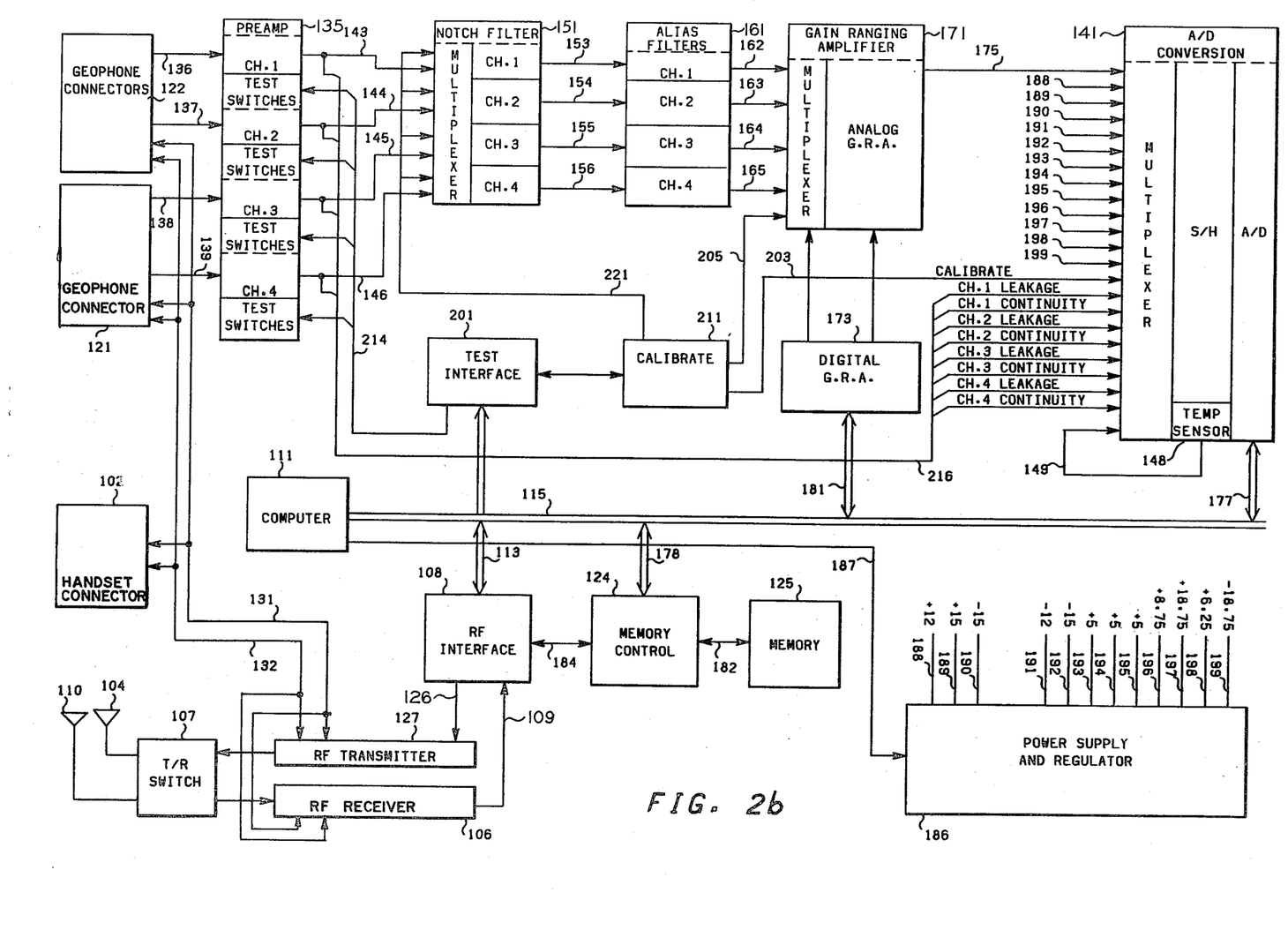
FIG. 2b is a block diagram of a remote telemetry unit.
Figure 23:
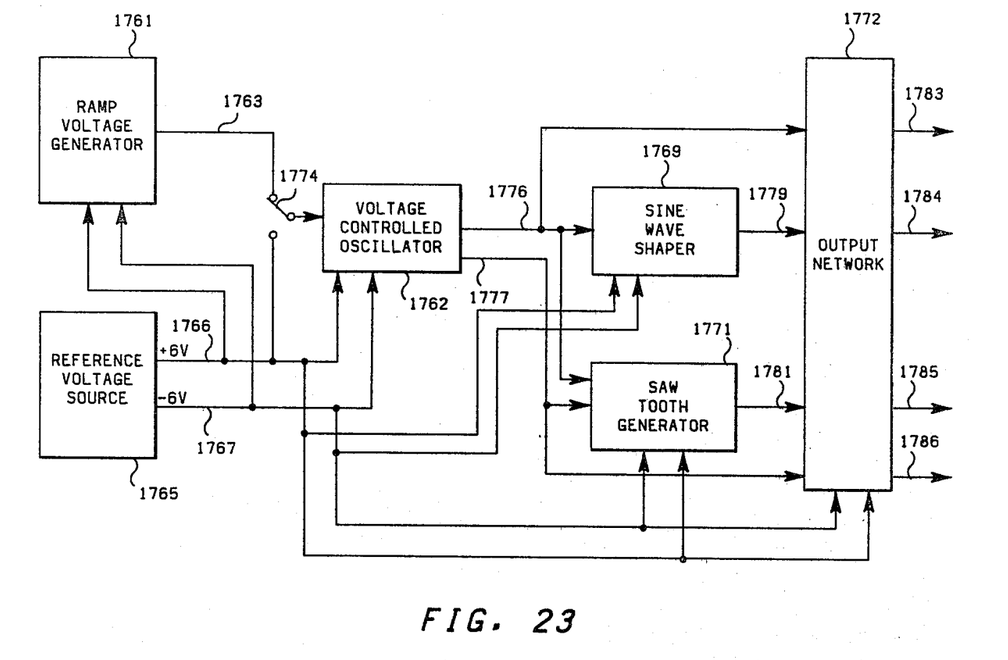
FIG. 23 is a block diagram of a separate testing unit for the remote telemetry unit illustrated in FIG. 2b.
Figure 24:
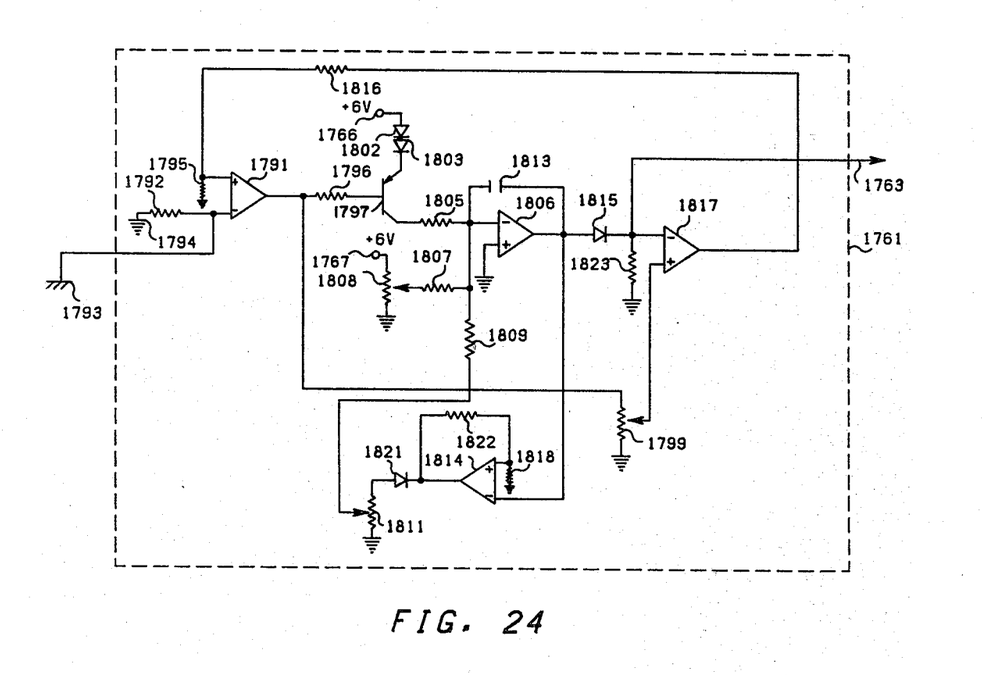
FIG. 24 is a schematic of the ramp generator illustrated in FIG. 23.
Figure 25:
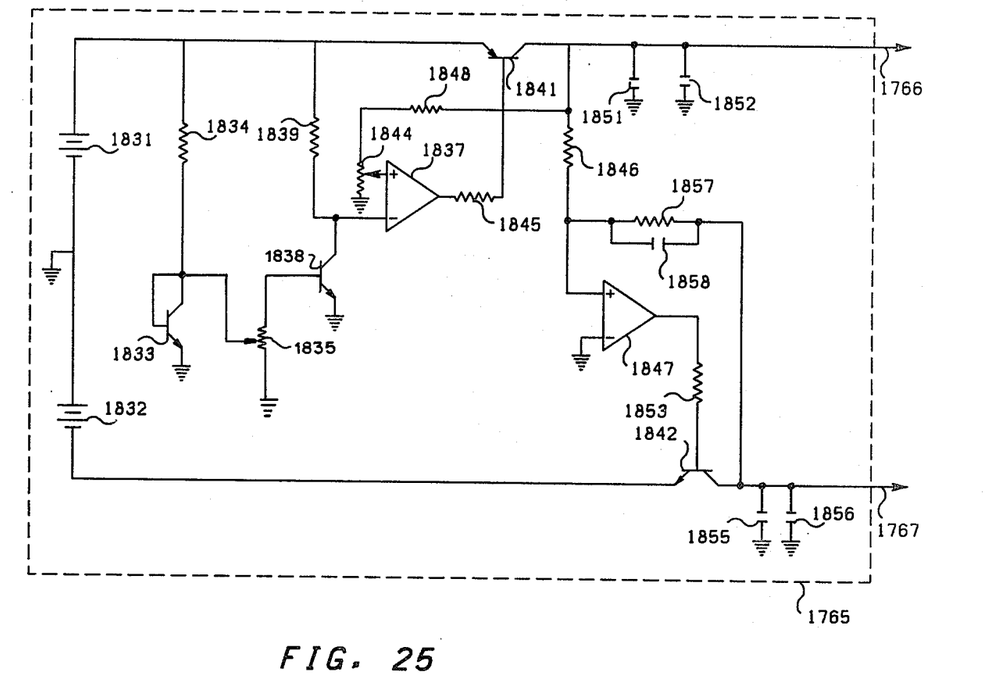
FIG. 25 is a schematic of the reference voltage source illustrated in FIG. 23.
Figure 26:
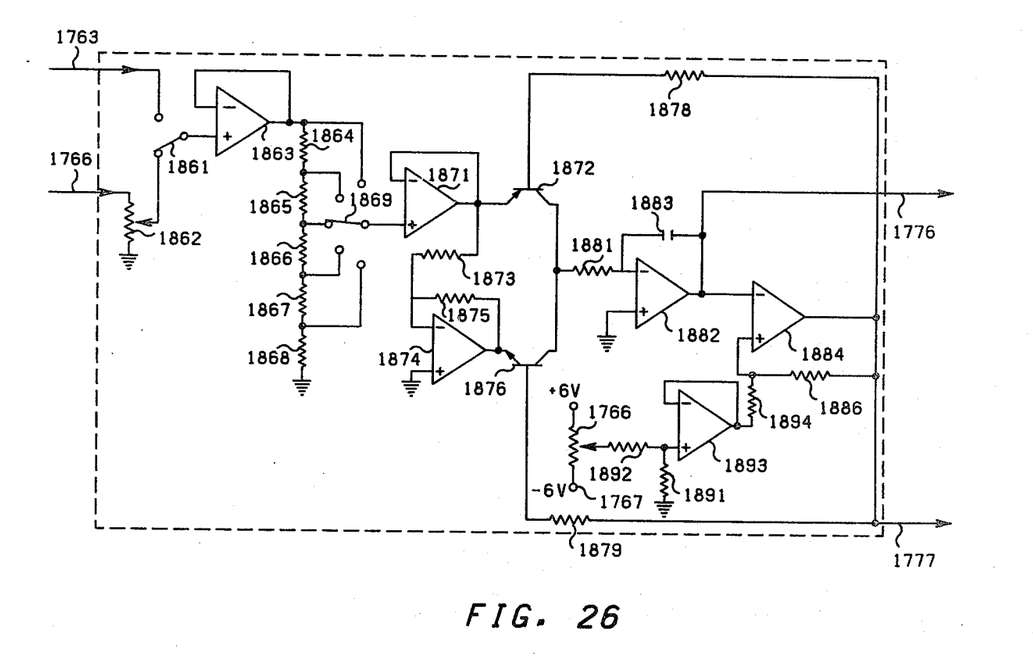
FIG. 26 is a schematic of the voltage controlled oscillator illustrated in FIG. 23.
Figure 27:
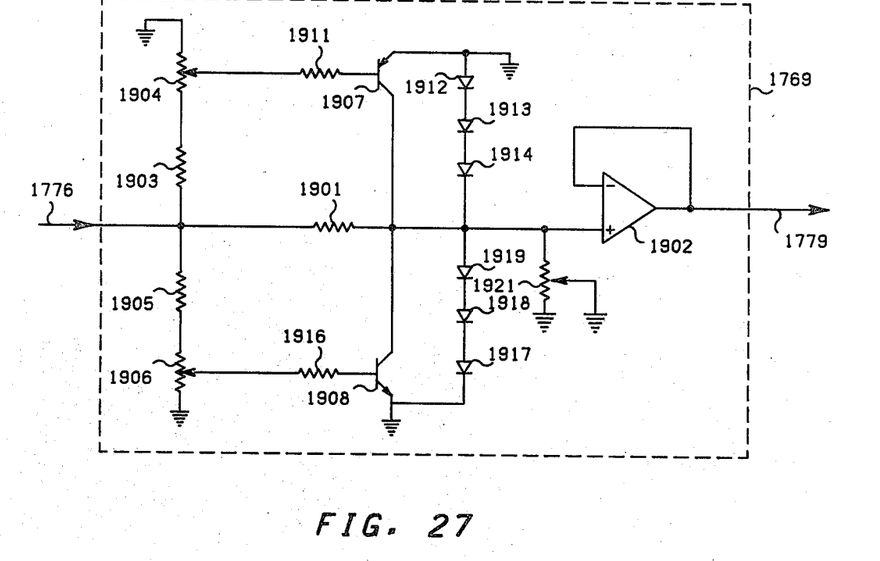
FIG. 27 is a schematic of the sine wave shaper illustrated in FIG. 23.
Figure 28:
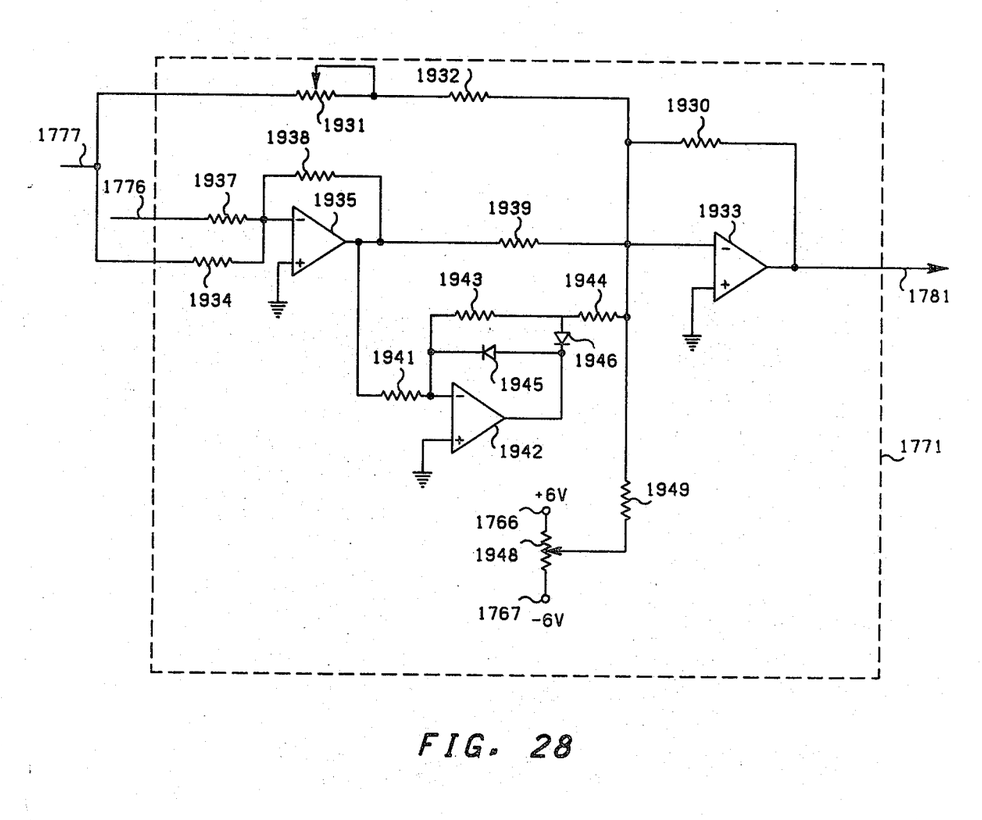
FIG. 28 is a schematic of the sawtooth generator illustrated in FIG. 23.
Figure 29:
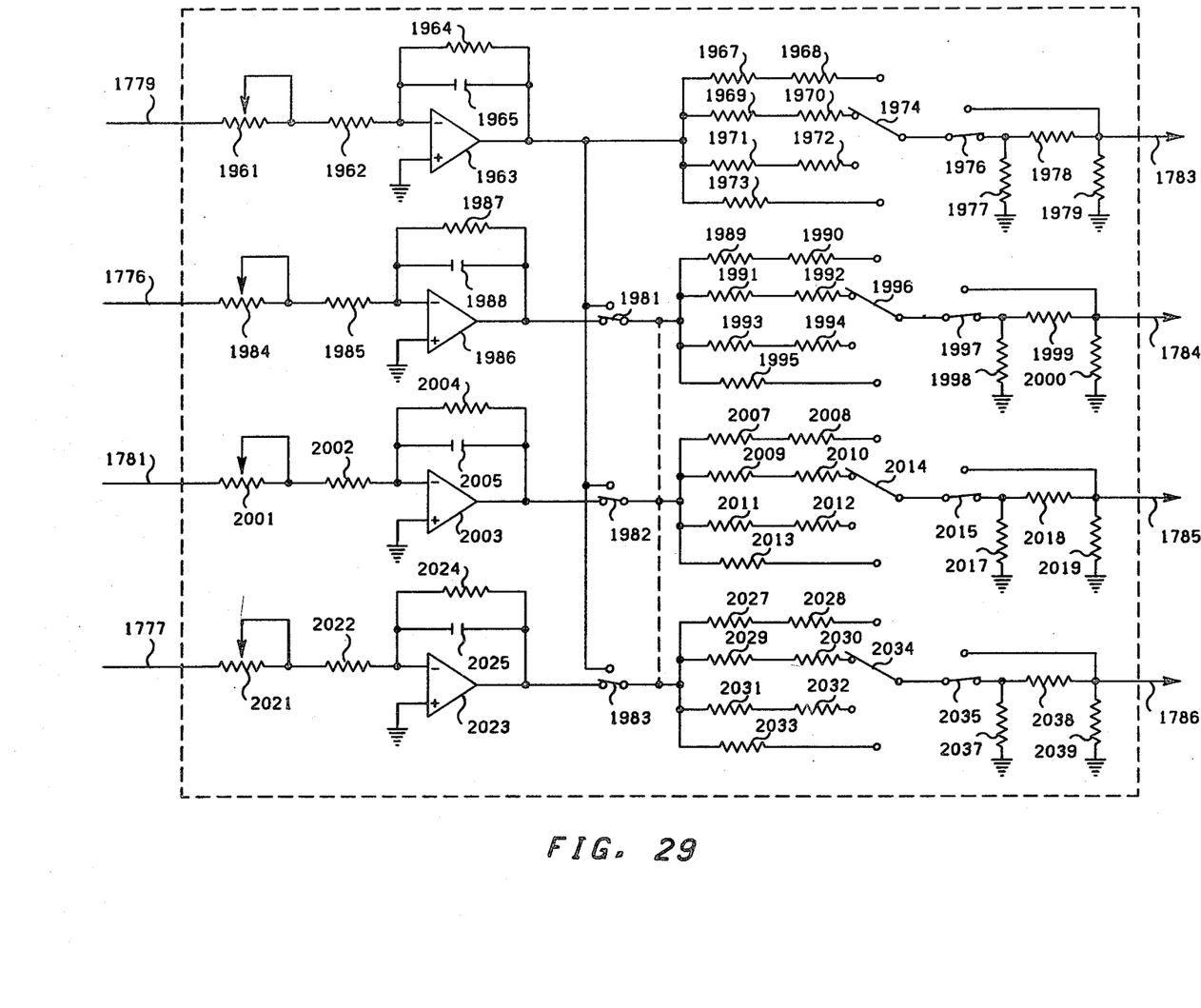
FIG. 29 is a schematic of the output network illustrated in FIG. 23.

FIGS. 3–22b and 30–73 of U.S. Pat. No. 4,257,098 are hereby incorporated by reference. The brief description of FIGS. 3–22b and 30–73 in U.S. Pat. No. 4,257,098 is also hereby incorporated by reference.

The detailed description of the drawings and the Appendix of U.S. Pat. No. 4,257,098 are hereby incorporated by reference.

That which is claimed is:

1. In a seismic system for geophysical exploration comprising:
 a plurality of remote geophone monitoring means, each of said remote geophone monitoring means being adapted to receive electrical signals from at least one geophone means; and
 a central control means for generating electrical signals for initiating the operations of said plurality of remote geophone monitoring means;
 each of said plurality of remote geophone monitoring means comprising:
  a plurality of means for sampling electrical signals, provided from at least one geophone means, and for converting the sampled electrical signals into digital seismic data; and
  means for transmitting said digital seismic data to said central control means;
 said central control means comprising:
  means for transmitting commands to said plurality of remote geophone monitoring means; and
  means for receiving data from said plurality of remote geophone monitoring means;
 means for testing said plurality of means for sampling geophone monitoring means, comprising:
  means for generating simultaneously a plurality of output signals which each have a different waveform;
  means for supplying power from a battery pack to said means for generating simultaneously a plurality of output signals to thereby supply all of the power required by said means for generating simultaneously a plurality of output signals; and
  means for simultaneously supplying respective one of said plurality of output signals from said means for testing said plurality of means for sampling electrical signals to respective ones of said plurality of means for sampling electrical signals to thereby test said plurality of means for sampling electrical signals.

2. Apparatus in accordance with claim 1 wherein said means for generating simultaneously a plurality of output signals comprises:
 means for generating a regulated voltage which has a substantially constant voltage level;
 means for generating a triangular waveform in response to a voltage input;
 means for supplying said regulated voltage as a voltage input to said means for generating a triangular waveform to thereby enable said means for generating a triangular waveform to output a triangular waveform;
 means for generating a square waveform in response to a voltage input;
 means for supplying said regulated voltage as a voltage input to said means for generating a square waveform to thereby enable said means for generating a square waveform to output a square waveform;
 means for generating a sine waveform in response to a triangular waveform;
 means for supplying said triangular waveform as an input to said means for generating a sine waveform to thereby enable said means for generating a sine waveform to output a sine waveform;
 means for generating a sawtooth waveform in response to a triangular waveform and a square waveform; and
 means for supplying said triangular waveform and said square waveform as inputs to said means for generating a sawtooth waveform to thereby enable said means for generating a sawtooth waveform to output a sawtooth waveform.

3. Apparatus in accordance with claim 2 wherein said means for simultaneously supplying respective ones of said plurality of output signals from said means for testing said plurality of means for sampling electrical signals to respective ones of said plurality of means for sampling electrical signals comprises means for simultaneously supplying said triangular waveform, said sawtooth waveform, said sine waveform, and said square waveform as output signals from said means for testing said plurality of means for sampling electrical signals to respective ones of said plurality of means for sampling electrical signals.

4. Apparatus in accordance with claim 2 wherein said means for generating a regulated voltage comprises:
 at least one battery;
 a first transistor having the base thereof electrically connected to the collector thereof and having the emitter thereof electrically connected to the ground;

a first resistive element;

means for electrically connecting the positive terminal of said at least one battery through said first resistive element to the collector of said transistor, the forward voltage-current characteristics of the base to emitter junction of said first transistor holding the collector of said first transistor at a substantially constant voltage level;

a second transistor having the emitter thereof grounded;

a second resistive element;

means for electrically connecting the collector of said first transistor through said resistive element to the base of said second transistor;

a third resistive element;

means for electrically connecting the positive terminal of said at least one battery through said third resistive element to the collector of said second transistor, the collector of said second transistor remaining at a substantially constant voltage level even if the voltage level provided from said at least one battery varies;

an operational amplifier having an inverting input terminal, a noninverting input terminal, and an output terminal;

means for electrically connecting the collector of said second transistor to the inverting terminal of said operational amplifier;

a third transistor;

means for electrically connecting the collector of said second transistor to the inverting terminal of said operational amplifier;

a third transistor;

means for electrically connecting the positive terminal of said at least one battery to the emitter of said third transistor;

means for electrically connecting the base of said third transistor to the output of said operational amplifier; and means for supplying a sampling voltage, representative of said regulated output voltage, to the noninverting terminal of said operational amplifier, the output from said operational amplifier substantially controlling the extent to which said third transistor is turned on to thereby control the voltage level of said regulated output voltage which is supplied from the collector of said third transistor.

5. Apparatus in accordance with claim 2 wherein said means for generating said triangular waveform and said means for generating said square waveform comprises:

a PNP transistor;

a NPN transistor;

means for supplying said regulated voltage to the emitter of said PNP transistor;

means for inverting said regulated voltage and for supplying the inverted regulated voltage to the emitter of said NPN transistor;

integrating means having at least one input and an output;

means for electrically connecting the collector of said PNP transistor and the collector of said NPN transistor to said at least one input of said integrating means;

a comparator means having an inverting input, a noninverting input and an output;

means for electrically connecting the output of said integrating means to the inverting input of said comparator means;

a voltage divider network means;

means for electrically connecting the output of said comparator means through said voltage divider network means to the noninverting input of said comparator means; and means for electrically connecting the output of said comparator means to the base of said PNP transistor and the base of said NPN transistor, said triangular waveform being supplied from the output of said integrating means, said square waveform being supplied from the output of said comparator means.

6. Apparatus in accordance with claim 5 wherein said means for supplying said regulated voltage to the emitter of said PNP transistor comprises:

a voltage divider network having a plurality of outputs;

a switching means having a plurality of inputs and an output;

means for electrically connecting a particular one of the plurality of outputs from said voltage divider means to a particular one of the plurality of inputs to said switching means;

a buffer amplifier means having an inverting input, a noninverting input and an output;

means for electrically connecting the output of said switching means to the noninverting input of said buffer amplifier means; and means for electrically connecting the output of said buffer amplifier means to the emitter of said PNP transistor, said regulated voltage being supplied through said voltage divider means and said switching means to thereby provide a plurality of regulated voltage levels, the frequency of said triangular waveform and said square waveform being dependent upon the voltage level supplied from the output of said switching means.

7. Apparatus in accordance with claim 5 wherein said means for inverting said regulated voltage and for supplying said inverted regulated voltage to the emitter of said NPN transistor comprises:

a voltage divider network having a plurality of outputs;

a switching means having a plurality of inputs and an output;

means for electrically connecting a particular one of the plurality of outputs from said voltage divider means to a particular one of the plurality of inputs to said switching means;

a buffer amplifier means having an inverting input, a noninverting input and an output;

means for electrically connecting the output of said switching means to the noninverting input of said buffer amplifier means;

an inverting amplifier means; and means for electrically connecting the output of said buffer amplifier means through said inverting amplifier means to the emitter of said NPN transistor, said regulated voltage being supplied through said voltage divider means and said switching means to thereby provide a plurality of regulated voltage levels, the frequency of the triangular waveform and said square waveform being dependent upon the voltage level supplied from the output of said switching means.

8. Apparatus in accordance with claim 2 wherein said means for supplying a sine waveform comprises:
   means for rounding the top of a triangular waveform;
   means for supplying said triangular waveform to said means for rounding the top of said triangular waveform;
   means for changing the slope of a triangular waveform; and
   means for supplying triangular waveform, having the top thereof rounded, from said means for rounding the top of a triangular waveform to said means for changing the slope of a triangular waveform.

9. Apparatus in accordance with claim 8 wherein said means for rounding the top of said triangular waveform comprises:
   a PNP transistor;
   a voltage divider network;
   at least one first diode;
   means for supplying said triangular waveform through said first voltage divider network to the base of said PNP transistor;
   means for electrically connecting the anode of said at least one first diode to the emitter of said PNP transistor;
   means for supplying said triangular waveform to the collector of said PNP transistor;
   means for supplying said triangular waveform to the cathode of said at least one first diode;
   an NPN transistor;
   at least one second diode;
   a second voltage divider network;
   means for supplying said triangular waveform through said second voltage divider network to the base of said NPN transistor;
   means for electrically connecting the cathode of said at least one second diode to the emitter of said NPN transistor;
   means for supplying said triangular waveform to the collector of said NPN transistor; and
   means for supplying said triangular waveform to the anode of said at least one second diode.

10. Apparatus in accordance with claim 9 wherein said means for changing the slope of said triangular waveform comprises a potentiometer means.

11. Apparatus in accordance with claim 2 wherein said means for supplying a sawtooth waveform comprises:
    summing means having first and second inputs and an output;
    means for supplying said triangular waveform to said first input of said summing means;
    means for supplying said square waveform to said second input of said summing means;
    a full wave rectifier means having first and second inputs and an output;
    means for supplying the output of said summing means, representative of the summation of said triangular waveform and said square waveform, to said first input of said full wave rectifier means; and
    means for supplying said triangular waveform to said second input of said full wave rectifier means, said sawtooth waveform being supplied from the output of said full wave rectifier means.

12. Apparatus in accordance with claim 1 wherein said means for generating simultaneously a plurality of output signals comprises:
    means for generating a ramp voltage waveform which has a substantially constant slope with respect to time;
    means for generating a triangular waveform in response to a voltage input;
    means for supplying said ramp voltage waveform to said means for generating a triangular waveform to thereby enable said means for generating a triangular waveform to output a triangular waveform;
    means for generating a square waveform in response to a voltage input;
    means for supplying said ramp voltage waveform to said means for generating a square waveform to thereby enable said means for generating a square waveform to output a square waveform;
    means for generating a sine waveform in response to a triangular waveform;
    means for supplying said triangular waveform to said means for generating a sine waveform to thereby enable said means for generating a sine waveform to output a sine waveform;
    means for generating a sawtooth waveform in response to a triangular waveform and square waveform; and
    means for supplying said triangular waveform and said square waveform to said means for generating a sawtooth waveform to thereby enable said means for generating a sawtooth waveform to output a sawtooth waveform.

13. Apparatus in accordance with claim 12 wherein said means for simultaneously supplying respective ones of said plurality of output signals from said means for testing said plurality of means for sampling electrical signals to respective ones of said plurality of means for sampling electrical signals comprises means for simultaneously supplying said triangular waveform, said sawtooth waveform, said sine waveform, and said square waveform as output signals from said means for testing said plurality of means for sampling electrical signals to respective ones of said plurality of means for sampling electrical signals.

14. Apparatus in accordance with claim 12 wherein said means for generating a ramp voltage waveform comprises an integrating means.

15. Apparatus in accordance with claim 12 wherein said means for generating said triangular waveform and said means for generating said square waveform comprises:
    a PNP transistor;
    a NPN transistor;
    means for supplying said ramp voltage waveform to the emitter of said PNP transistor;
    means for inverting said ramp voltage waveform and for supplying the inverted ramp voltage waveform to the emitter of said NPN transistor;
    integrating means having at least one input and an output;
    means for electrically connecting the collector of said PNP transistor and the collector of said NPN transistor to said at least one input of said integrating means;
    a comparator means having an inverting input, a noninverting input and an output;
    means for electrically connecting the output of said integrating means to the inverting input of said comparator means;
    a voltage divider network means;

means for electrically connecting the output of said comparator means through said voltage divider network means to the noninverting input of said comparator means; and means for electrically connecting the output of said comparator means to the base of said PNP transistor and to the base of said NPN transistor, said triangular waveform being supplied from the output of said integrating means, said square waveform being supplied from the output of said comparator means.

16. Apparatus in accordance with claim 15 wherein said means for supplying said ramp voltage waveform to the emitter of said PNP transistor comprises:

a voltage divider network having a plurality of outputs;

a switching means having a plurality of inputs and an output;

means for electrically connecting a particular one of the plurality of outputs from said voltage divider means to a particular one of the plurality of inputs to said switching means;

a buffer amplifier means having an inverting input, a noninverting input and an output;

means for electrically connecting the output of said switching means to the noninverting input of said buffer amplifier means; and means for electrically connecting the output of said buffer amplifier means to the emitter of said PNP transistor, said ramp voltage waveform being supplied through said voltage divider means and said switching means to thereby provide a plurality of voltage levels, the frequency of said triangular waveform and said square waveform being dependent upon the voltage level supplied from the output of said switching means.

17. Apparatus in accordance with claim 15 wherein said means for inverting said ramp voltage waveform and for supplying said inverted ramp voltage waveform to the emitter of said NPN transistor comprises:

a voltage divider network having a plurality of outputs;

a switching means having a plurality of inputs and an output;

means for electrically connecting a particular one of the plurality of outputs from said voltage divider means to a particular one of the plurality of inputs to said switching means;

a buffer amplifier means having an inverting input, a noninverting input and an output;

means for electrically connecting the output of said switching means to the noninverting input of said buffer amplifier means;

an inverting amplifier means; and means for electrically connecting the output of said buffer amplifier means through said inverting amplifier means to the emitter of said NPN transistor, said ramp voltage waveform being supplied through said voltage divider means and said switching means to thereby provide a plurality of voltage levels, the frequency of the triangular waveform and said square waveform being dependent upon the voltage level supplied from the output of said switching means.

18. Apparatus in accordance with claim 12 wherein said means for supplying a sine waveform comprises:
means for rounding the top of a triangular waveform;

means for supplying said triangular waveform to said means for rounding the top of said triangular waveform;

means for changing the slope of a triangular waveform; and means for supplying said triangular waveform, having the top thereof rounded from said means for rounding the top of a triangular waveform to said means for changing the slope of a triangular waveform.

19. Apparatus in accordance with claim 18 wherein said means for rounding the top of said triangular waveform comprises:

PNP transistor;

a first voltage divider network;

at least one first diode;

means for supplying said triangular waveform through said first voltage divider network to the base of said PNP transistor;

means for electrically connecting the anode of said at least one first diode to the emitter of said PNP transistor;

means for supplying said triangular waveform to the collector of said PNP transistor;

means for supplying said triangular waveform to the cathode of said at least one first diode;

a NPN transistor;

at least one second diode;

a second voltage divider network;

means for supplying said triangular waveform through said second voltage divider network to the base of said NPN transistor;

means for electrically connecting the cathode of said at least one second diode to the emitter of said NPN transistor;

means for supplying said triangular waveform to the collector of said NPN transistor; and means for supplying said triangular waveform to the anode of said at least one second diode.

20. Apparatus in accordance with claim 19 wherein means for changing the slope of said triangular waveform comprises a potentiometer means.

21. Apparatus in accordance with claim 12 wherein said means for supplying a sawtooth waveform comprises:

summing means having first and second inputs and an output;

means for supplying said triangular waveform to said first input of said summing means;

means for supplying said square waveform to said second input of said summing means;

a full wave rectifier means having first and second inputs and an output;

means for supplying the output of said summing means, representative of the summation of said triangular waveform and said square waveform, to said first input of said full wave rectifier means; and means for supplying said triangular waveform to said second input of said full wave rectifier means, said sawtooth waveform being supplied from the output of said full wave rectifier means.

22. A method for testing a plurality of data acquistion channels associated with a remote geophone monitoring means which is controlled from a central control means comprising the steps of:

generating simultaneously a plurality of output signals which each have a different waveform using only battery power to supply power for generating said plurality of output signals; and supplying respective ones of said plurality of output signals to respective ones of said plurality of data acquistion channels to thereby test said plurality of data acquistion channels.

23. A method in accordance with claim 22 wherein said step of generating simultaneously a plurality of output signals which each have a different waveform comprises:
  generating a first electrical voltage signal;
  generating a triangular waveform in response to said first electrical voltage signal;
  generating a square waveform in response to said first electrical voltage signal;
  generating a sine waveform in response to said triangular waveform; and
  generating a sawtooth waveform in response to said triangular waveform and said square waveform.

24. A method in accordance with claim 23 wherein said step of applying respective ones of said plurality of output signals to respective ones of said plurality of data acquistion channels comprises supplying said triangular waveform, said sawtooth waveform, said sine waveform and said square waveform as said plurality of output signals to respective ones of said plurality of data acquistion channels.

25. A method in accordance with claim 23 wherein said first electrical voltage signal is a ramp voltage waveform and said triangular waveform, said square waveform, said sine waveform and said sawtooth waveform having varying frequencies.

26. A method in accordance with claim 23 wherein said first electrical voltage signal is a regulated voltage which has a substantially constant voltage level and said triangular waveform, said square waveform, said sine waveform and said sawtooth waveform have constant frequencies.

27. A method in accordance with claim 26 wherein the step of generating a regulated voltage which has a substantially constant voltage level comprises:
  using the forward voltage current characteristics of the base to emitter junction of a transistor to supply a reference voltage;
  comparing said reference voltage to the voltage level of said regulated voltage and generating a first signal representative of the comparison of said reference voltage to the voltage level of said regulated voltage; and
  utilizing said first signal to control the voltage level of said regulated voltage.

28. A method in accordance with claim 27 wherein the step of utilizing said first signal to control the voltage level of said regulated voltage comprises utilizing said first signal to control the extent to which a transistor is turned on to thereby control the voltage level of said regulated voltage.

29. A method in accordance with claim 23 wherein the step of generating said triangular waveform and said step of geneating said square waveform comprises:
  supplying said first electrical voltage signal to the emitter of a PNP transistor;
  inverting said first electrical voltage signal and supplying the inverted first electrical voltage signal to the emitter of a NPN transistor;
  electrically connecting the collector of said PNP transistor and the collector of said NPN transistor to the input of an integrating means;
  electrically connecting the output of said integrating means to the inverting input of said comparator means;
  electrically connecting the output of said comparator means through a voltage divider network means to the noninverting input of said comparator means; and
  electrically connecting the output of said comparator means to the base of said PNP transistor and to the base of said NPN transistor, said triangular waveform being supplied from the output of said integrating means, said square waveform being supplied from the output of said comparator means.

30. A method in accordance with claim 29 wherein said step of supplying said first electrical voltage signal to the emitter of said PNP transistor comprises:
  electrically connecting a particular one of a plurality of outputs from a voltage divider means to a particular one of a plurality of inputs to a switching means;
  electrically connecting the output of said switching means to the noninverting input of a buffer amplifier means; and
  electrically connecting the output of said buffer amplifier means to the emitter of said PNP transistor, said first electrical voltage signal being supplied through said voltage divider means and said switching means to thereby provide a plurality of voltage levels, the frequency of said triangular waveform and said square waveform being dependent upon the voltage level supplied from the output of said switching means.

31. A method in accordance with claim 29 wherein said step of inverting said first electrical voltage signal and for supplying said inverted first electrical voltage signal to the emitter of said NPN transistor comprises:
  electrically connecting a particular one of a plurality of outputs from a voltage divider means to a particular one of the plurality of inputs to said switching means;
  electrically connecting the output of said switching means to the noninverting input of a buffer amplifier means;
  electrically connecting the output of said buffer amplifier means through an inverting amplifier means to the emitter of said NPN transistor, said first electrical voltage signal being supplied through said voltage divider means and said switching means to thereby provide a plurality of voltage levels, the frequency of the triangular waveform and said square waveform being dependent upon the voltage level supplied from the output of said switching means.

32. A method in accordance with claim 23 wherein said step of generating a sine waveform comprises:
  rounding the top of a triangular waveform; and
  changing the slope of a triangular waveform.

33. A method in accordance with claim 32 wherein said step of rounding the top of said waveform comprises:
  supplying said triangular waveform through a first voltage divider network to the base of a PNP transistor;
  electrically connecting the anode of at least one first diode to the emitter of said PNP transistor;
  supplying said triangular waveform to the collector of said PNP transistor;

supplying said triangular waveform to the cathode of said at least one first diode;
supplying said triangular waveform through a second voltage divider network to the base of a NPN transistor;
electrically connecting the cathode of at least one second diode to the emitter of said NPN transistor;
supplying said triangular waveform to the collector of said NPN transistor; and
supplying said triangular waveform to the anode of said at least one second diode.

34. A method in accordance with claim 33 wherein said step of changing the slope of said triangular waveform comprises supplying the triangular waveform having the peaks thereof rounded through a potentiometer means to thereby change the slope of said triangular waveform to more closely approximate a sine waveform.

35. A method in accordance with claim 23 wherein said step of generating a sawtooth waveform comprises:
summing said triangular waveform and said square waveform to thereby generate a first signal;
supplying said first signal to a first input of a full wave rectifier means; and
supplying said triangular waveform to a second input of said full wave rectifier means, said sawtooth waveform being supplied from the output of said full wave rectifier means.

* * * * *

UNITED STATES PATENT AND TRADEMARK OFFICE
CERTIFICATE OF CORRECTION

PATENT NO. : 4,305,274

DATED : December 15, 1981

INVENTOR(S) : James E. Layton

It is certified that error appears in the above—identified patent and that said Letters Patent is hereby corrected as shown below:

Claim 1, column 3, line 8, after "the", "operations" should be --- operation --- .

Claim 1, column 4, line 11, after "respective", "one" should be --- ones --- .

Claim 19, column 10, line 4, before "PNP", should be --- a --- .

Claim 33, column 12, line 2, after "said", second occurrence, should be --- triangular --- .

Signed and Sealed this

Seventeenth Day of August 1982

[SEAL]

Attest:

*Attesting Officer*

GERALD J. MOSSINGHOFF

*Commissioner of Patents and Trademarks*